United States Patent
Tang et al.

(10) Patent No.: US 10,739,485 B2
(45) Date of Patent: Aug. 11, 2020

(54) JOINT VISUALIZATION OF INVERSION RESULTS AND MEASUREMENT LOGS

(71) Applicant: Halliburton Energy Services, Inc., Houston, TX (US)

(72) Inventors: Yumei Tang, Tomball, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 310 days.

(21) Appl. No.: 15/767,777

(22) PCT Filed: Dec. 31, 2015

(86) PCT No.: PCT/US2015/068249
§ 371 (c)(1),
(2) Date: Apr. 12, 2018

(87) PCT Pub. No.: WO2017/116460
PCT Pub. Date: Jul. 6, 2017

(65) Prior Publication Data
US 2018/0306942 A1    Oct. 25, 2018

(51) Int. Cl.
*G01V 1/46* (2006.01)
*E21B 47/00* (2012.01)
(Continued)

(52) U.S. Cl.
CPC ............. *G01V 1/46* (2013.01); *E21B 47/00* (2013.01); *G01V 1/345* (2013.01); *G01V 1/48* (2013.01);
(Continued)

(58) Field of Classification Search
CPC ... G01V 1/46; G01V 3/18; G01V 1/48; G01V 1/345; G01V 1/50; G01V 11/00; G01V 2200/16; G01V 2210/6224; E21B 47/00
(Continued)

(56) References Cited

U.S. PATENT DOCUMENTS 2,927,656 A     3/1960  Feagin et al.
5,675,147 A *  10/1997  Ekstrom ................ G01V 11/00
                                                                    250/256
(Continued)

FOREIGN PATENT DOCUMENTS

GB      2322197 A     8/1998
WO    2014123509 A1   8/2014
WO    2014200491 A1  12/2014

OTHER PUBLICATIONS

"International Application Serial No. PCT/US2015/068249, International Search Report dated Sep. 29, 2016", 4 pgs.
(Continued)

*Primary Examiner* — Daniel L Murphy
(74) *Attorney, Agent, or Firm* — Gilliam IP PLLC (57) ABSTRACT

Apparatus and methods to generate a two-dimensional image of the well can include control of measurements in a well to generate a log of the well and use of such measurements and/or logs with a log of a reference well. The boundary positions of layers of the well can be correlated with corresponding boundary positions from the reference well. Such apparatus and methods or similar apparatus and methods can be implemented in a variety of applications.

14 Claims, 7 Drawing Sheets

(51) Int. Cl.
*G01V 1/50* (2006.01)
*G01V 3/18* (2006.01)
*G01V 1/48* (2006.01)
*G01V 1/34* (2006.01)
*G01V 11/00* (2006.01)

(52) U.S. Cl.
CPC .................. *G01V 1/50* (2013.01); *G01V 3/18* (2013.01); *G01V 11/00* (2013.01); *G01V 2200/16* (2013.01); *G01V 2210/6224* (2013.01)

(58) Field of Classification Search
USPC ............................................................ 367/25
See application file for complete search history.

(56) References Cited

U.S. PATENT DOCUMENTS

| | | | |
|---|---|---|---|
| 6,388,947 B1 * | 5/2002 | Washbourne | G01V 1/42 367/38 |
| 2006/0052937 A1 | 3/2006 | Zoraster et al. | |
| 2006/0074561 A1 | 4/2006 | Xia et al. | |
| 2008/0105424 A1 | 5/2008 | Remmert et al. | |
| 2008/0314137 A1 | 12/2008 | Proett et al. | |
| 2009/0250264 A1 | 10/2009 | Dupriest | |
| 2009/0277686 A1 | 11/2009 | Hartmann et al. | |
| 2015/0260874 A1 | 9/2015 | Chen et al. | |

OTHER PUBLICATIONS

"International Application Serial No. PCT/US2015/068249, Written Opinion dated Sep. 29, 2016", 11 pgs.
EP Application Serial No. 15 912 203.5; Extended European Search Report; dated Nov. 6, 2018, 8 pages.

* cited by examiner

JOINT VISUALIZATION OF INVERSION RESULTS AND MEASUREMENT LOGS

TECHNICAL FIELD

The present invention relates generally to apparatus and methods with respect to measurements related to oil and gas exploration.

BACKGROUND

In oil and gas exploration, it is crucial to accurately place a well within a targeted section. Logging-while-drilling (LWD) instruments, such as resistivity, acoustic, gamma ray and density tools, can be used in geosteering solutions to place a well. Geosteering is an intentional control to adjust drilling direction in a borehole, which may also be referred to as a wellbore. The control can be based on downhole logging measurements, such as LWD measurements, to increase the borehole's exposure to a hydrocarbon-bearing formation (the "payzone"). Such geosteering can be used to maintain a borehole within a region that provides a material that is a source of economic value. Geosteering can be used to optimize well placement for maximum oil recovery. A control of geosteering may be based one or more properties of earth formations as a function of distance from a reference point.

The real-time data measurement along the drilling well from instruments such as LWD instruments can provide accurate well position in the subsurface formation. Also, the LWD data can provide valuable knowledge of the formation. Enhancements with respect to the measurement instruments and operational procedures associated with such instruments can provide improved production.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a new formation image plotting method can be implemented with downhole measurements and offsite information. The downhole measurements can be implemented with LWD measurements. Herein, offsite information is information generated at a location different from the well of interest. Offsite is also referred to herein as offset. Offsite measurements can be made at and/or with respect to a well different from the well of interest. The well associated with the offsite measurements may be referred to as an offsite well, which can used as a reference well and the associated information can be referred to as reference information. In the plotting, the local bedding geology structure can be inverted from LWD logs and a formation profile can be defined by offsite measurements. Thus, the insight of drilling position incorporating completed drilling zone information can help to make correct drilling decisions. An efficient visualization solution has been developed that includes formation character from the offsite well information and real-time inverted formation layer parameters from LWD data. This provides the ability to guide the current drilling procedure and future well plan.

A LWD resistivity sensor, such the Azimuthal Deep Resistivity (ADR™) sensor of Halliburton, can provide deep reading such as up to 18 feet into the formation, directional and high-resolution images that give early warning of approaching bed boundaries before a target zone is exited. The reading by the ADR™ makes it possible to estimate the layer boundary position with real-time measurements. However, the reading range of the ADR™ only can give local geometric bedding structure and the visualization with only LWD data shows the local information of the formation image. It is not possible to provide the accurate evaluation of the far intervals, such as resistivity and boundary position in the far zone over 18 feet. The similar response limitation happens for other LWD logging data. Vertical formation evaluation of a well log profile is available from the measurement of offsite wells. However, the offset well logs miss the formation change at different positions. To present an accurate formation profile, a new formation plotting can be made for the whole formation profile with mixed information from LWD data and offsite logs.

A directional resistivity tool, such has the ADR™, can have N tilted or coaxial transmitter antennas $T_1$, $T_2$, $T_3$, ..., $T_N$ spaced along the tool and can also have tiled or coaxial receiver antennas $R_1$ and $R_2$ that are axially spaced apart from the transmitter antennas and from each other. After the resistivity logging tool has been placed in a borehole and drilling commences, the tool can be rotated and can collect receiver measurements excited by multi-spacing and multi-frequency current source transmitters. Measurement along the 360 degrees of rotation can be obtained, while the tool rotates at the same position in the borehole.

These measurements distributed over the 360 degree can be divided into M bins, where each bin covers an angle equal to 360/M degrees. The first bin, named as bin 1 can be assigned to represent the measurement in the upper right direction perpendicular to the axis of the logging tool. If the total number of bin is 32, bin 17 is the reverse (opposite) direction of bin 1. Bin 1 can be set to correspond to any one of the M bins. Measurements with respect to different frequency and spacing have different sensitivities to formation parameters and different detection ability even for a same parameter. In general, a long spacing tool can be used to perform deep measurements for bed boundary and shoulder resistivity, while measurements of a short length tool can provide accurate information of local area.

Figure 1:
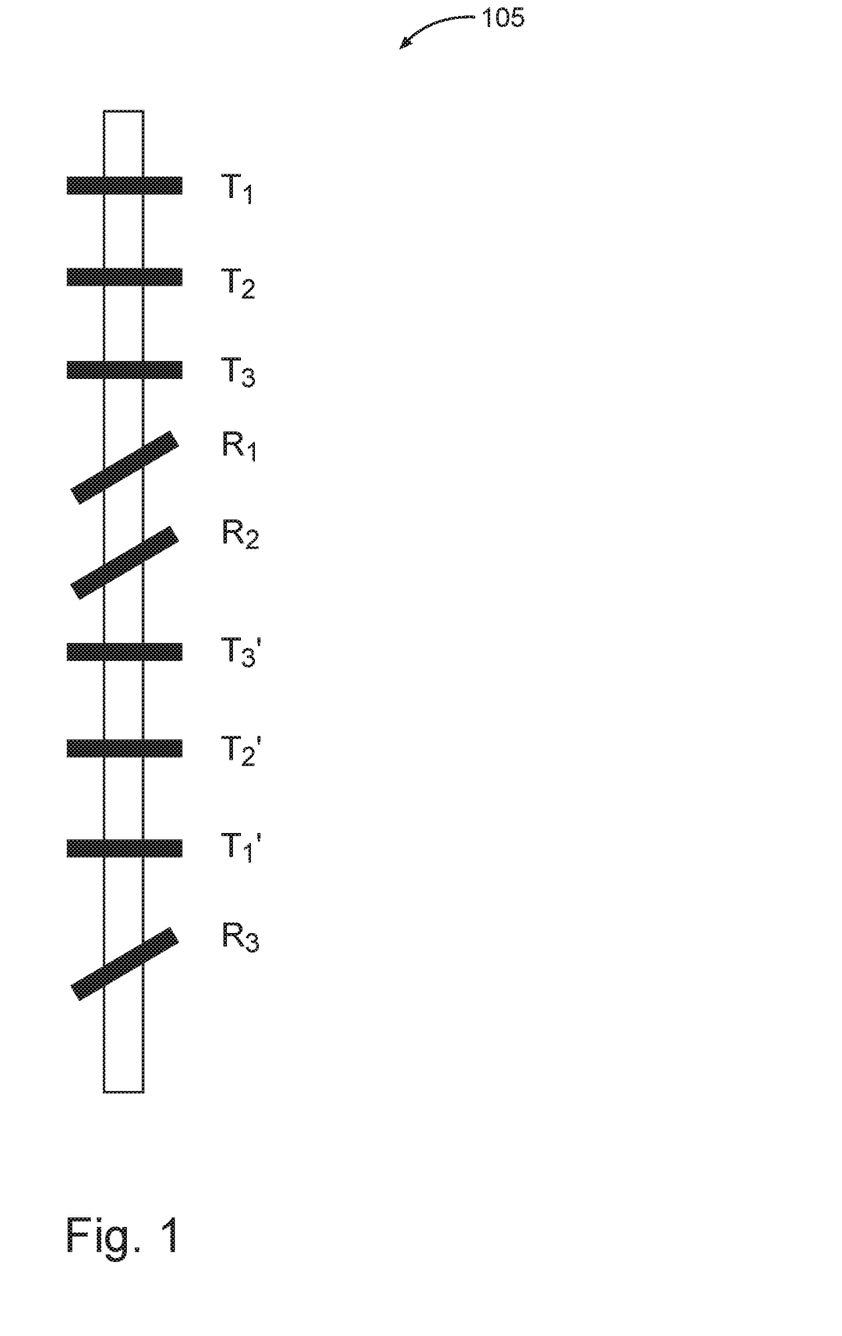
FIG. 1 is a schematic of an example downhole directional resistivity tool operable to generate signals for measurements for visualization, in accordance with various embodiments.

FIG. 1 is a schematic of an embodiment of an example downhole directional resistivity tool 105 operable to generate signals for measurements for visualization. The tool 105 has three symmetric coaxial transmitter antennas $T_1$-$T_1'$, $T_2$-$T_2'$ and $T_3$-$T_3'$ spaced along the tool with 16, 32 and 48 inch spacing to the center of two receivers $R_1$ and $R_2$. The tilted receiver antennas $R_1$ and $R_2$ are axially spaced apart from the transmitter antennas and from each other with 4 inch spacing length. In addition, a receiver antenna $R_3$ is located at a 64 inch position. The receivers $R_1$ and $R_2$ are tilted at 45 degrees with respect to the longitudinal axis of the tool. Multiple frequencies and spacing measurements of the tool 105 can be used to determine the bed boundary position along the drilling depth. Other tilt angles, number of transmitters, number of receivers, and distances between transmitters, receivers, and between transmitters and receivers, can be used.

To guide for planning a proposed well, some wellbores have been drilled close to the proposed well. The offset well logs of these wellbores, which are different wells from the proposed well, could identify formation geology structure that can be used to optimize the proposed well design. High quality offset well logs are important for well planning, since the formation of these wells is a complex and expensive operational cost. The offset well logs can include resistivity, gamma ray, density, neutron, and acoustic readings. Although these logs do not exactly match the LWD reading along the new drill well, the continuation of the formation allows for the correlation between the offset well logs and the LWD reading of the new drill well. Subsurface mapping is a way to visualize various geologic features from different well data.

To plot a formation image, logging measurements, such as density, acoustic, gamma ray and so on, can be made in an offsite well around the planned well. A layer structure is made with logs from the offsite well (reference well) along the vertical depth in the borehole, and a LWD resistivity log can be measured along the wellbore of the current well of interest. The boundary position can be inverted with the LWD resistivity measurements at a current logging point. With previous inverted layer position information, an updated boundary structure can be build up with LWD resistivity logs. The formation continuation in a field results in there being similar layer structure patterns between the offsite well and the current well.

Comparing two layer structures, formation boundary correspondence can be made between the offsite well and the current well. Although there are various changes to reading at a particular logging position, the correlativity of formation profile occurs between current and offsite wells. The corresponding of the position between the current well and the offsite well can be found with a layer pattern. Based on the matching result, the logs of the offsite well can be stretched to give the definition for the current well, which can be provided as a color definition. A two-dimensional (2D) image can be plotted like a curtain whose color is defined by the stretched density log of offsite well for the current well. Here stretching can be defined as a transformation between two sets of points. For example, a linear stretching between a non-stretched section that begins at depth x0 and ends at depth x1, and stretched section that begins at depth y0, and ends at depth y1 can be written as: $y=(x-x0)/(x1-x0)\times(y1-y0)+y0$, where x is a point in the non-stretched section, and y is the corresponding point in the stretched section. More advanced transformations that utilize information from adjacent sections may also be employed.

Figure 2:
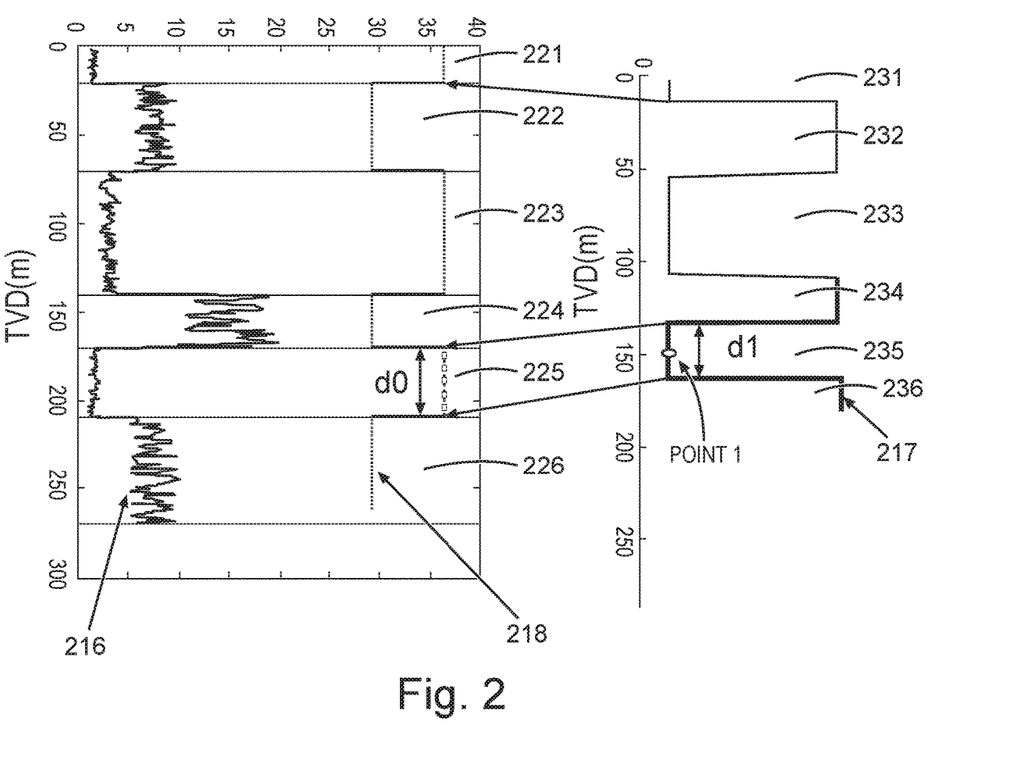
FIG. 2 is an illustration of an example boundary pattern matching procedure, in accordance with various embodiments.

FIG. 2 is an illustration of an embodiment of an example boundary pattern matching procedure. It shows an image plotting example with density logs from an offsite well and LWD resistivity measurement in a current well. The density logs have been made along a vertical offsite well. The formation layer structure is made with density changing along the true vertical depth (TVD) of the offset well, as shown in density logs 216 from the offsite well. A boundary pattern 218 from the density logs 216 of the offsite well indicates sections 221, 222, 223, 224, 225, and 226. LWD resistivity measurements are made in the current well. The layered structure is made with previous inverted result for the current well, shown as a boundary pattern 217 from LWD resistivity of current well, where the boundary pattern 217 has sections 231, 232, 233, 234, 235, and 236. The layered structure is made with current LWD resistivity measurements and d1 is the width of the layer section 235 inverted.

With the pattern matching method, a point 1 can be found at section 235. Other sections from the current well also find respectively matching sections. Adjustment of the density measurement in offset well logs can be made to match the formation structure of current well along the vertical depth. The width, d0, of section 225 can be stretched to match the width of d1 of the section 235, as d0 is different to d1. The density response of the offset well is given to the respectively logging point position in section 235 of the current well. The stretching can be done such that a corresponding boundary in density is drawn at the inverted boundary position, that is the boundaries of section 235 are matched to the boundaries of section 225. A two-dimensional (2D) image can be plotted with the stretched density reading along the TVD of the current well, as shown in FIG. 4.

Figure 4:
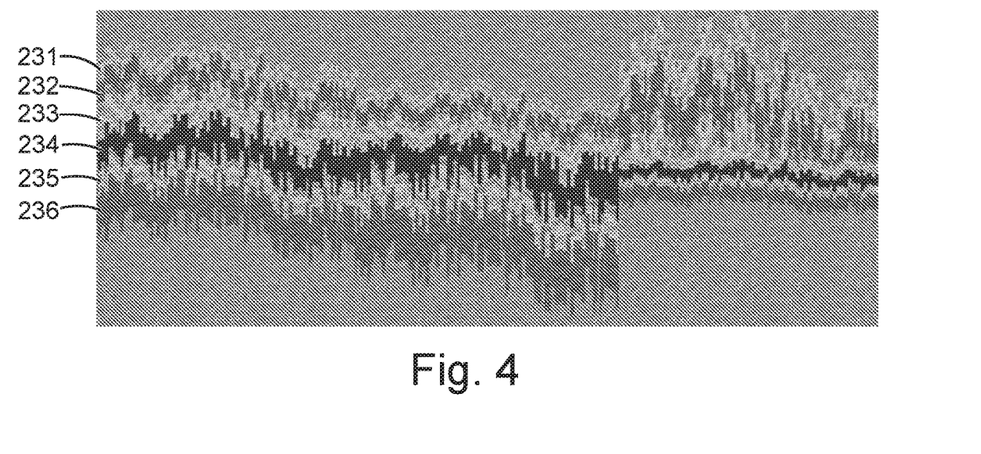
FIG. 4 is a two-dimensional image plot generated with logging-while-drilling measurements and offsite well logs, in accordance with various embodiments.

FIG. 4 is a 2D image plot generated with LWD and offsite well logs. In various embodiments, such offsite well logs are reference well logs. Sections 231, 232, 233, 234, and 235 of FIG. 2 are shown in FIG. 4. On a display, sections 231, 232, 233, 234, and 235 can be presented with different colors and/or shadings of colors. It is noted that what is provided in FIGS. 2 and 4 are just examples, and they do not limit the application to density logs only. Similar procedures can be applied to other logs from the offset well, such as resistivity, nuclear, acoustic, porosity, water saturation, oil saturation, water volume percentage, oil volume percentage measurements.

Figure 3:
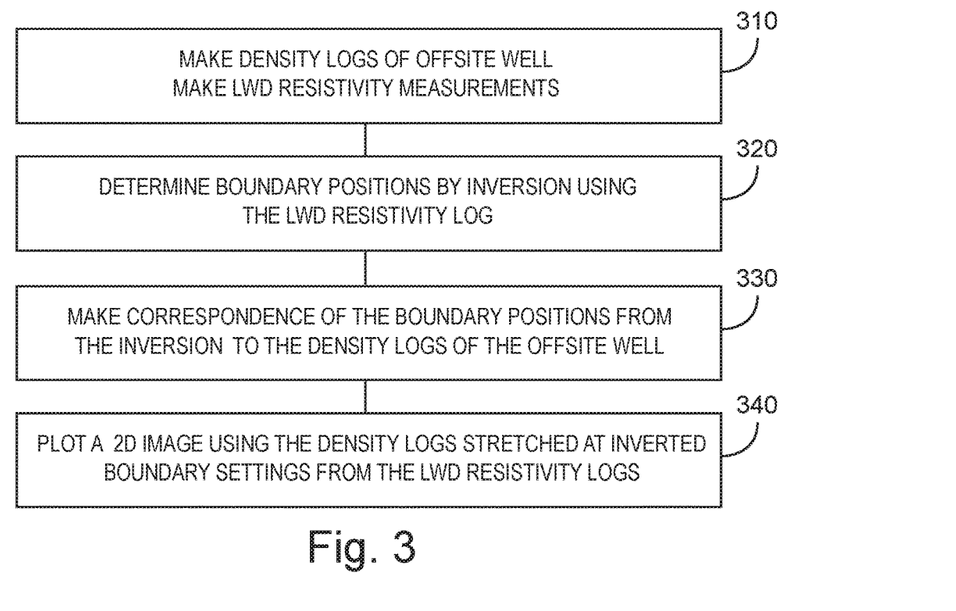
FIG. 3 is a processing flowchart of features of an example method of generating an image plot using a pattern matching method, in accordance with various embodiments.

FIG. 3 is a processing flowchart of features of an embodiment of an example method of generating an image plot using a pattern matching method. At 310, density logs of an offsite well are made and LWD resistivity measurements are made. At 320, boundary positions are determined by inversion using the LWD resistivity log. At 330, correspondence of the boundary positions from the inversion is made to the density logs of the offsite well. At 340, a 2D image is plotted using the density logs stretched at inverted boundary settings from the LWD resistivity logs.

In an embodiment, another image plotting method can be made with different methods. To match the offsite well logs, the respective logs can be made in the current well drilling. LWD logs, such as resistivity, density, gamma ray, and so on, can be attained along the wellbore. As with the previously discussed method, the boundary position can still be inverted with real-time LWD resistivity measurements. Available LWD logs at a current logging point can be used to identify the corresponding layer in the offset well. Although there are various changes to reading at a particular logging position, the correlativity of responses occurs in the similar formation for the same type measurements between current and offsite wells. The correspondence of the position between current well and offsite well can be found with reading the pattern and value. Such a correspondence procedure is similar as shown in FIGS. 2 and 3. The image plotting can be similar or identical to that of the method shown in FIG. 3.

Figure 5:
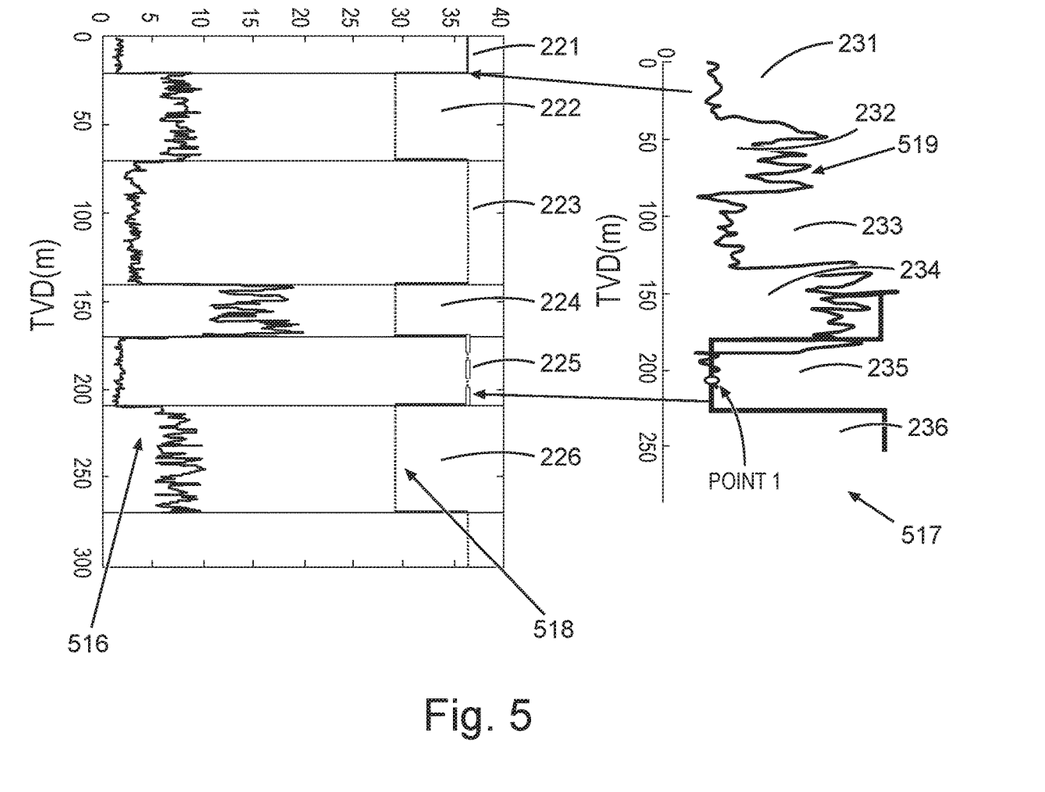
FIG. 5 is an illustration of a logging-while-drilling measurement matching procedure in which density is chosen as the corresponding log of the well of interest, in accordance with various embodiments.

FIG. 5 is an illustration of a LWD measurement matching procedure in which density is chosen as the corresponding log of the well of interest. A 2D image can be plotted where the image value at each depth is a stretched density log. The stretching is done such that a corresponding boundary in a density is drawn at the inverted boundary position. The whole matching procedure is effectively shown in FIG. 5. The LWD density logs are shown along the true vertical depth (TVD). The layered structure is made with previously inverted results for the current well, shown as a boundary pattern 517 from LWD resistivity of the current well, where the boundary pattern 517 has sections 231, 232, 233, 234, 235, and 236, as in FIG. 2. The formation layer structure is made with density changing along the vertical depth of the offset well, as shown in density logs 516 form the offsite well. A boundary pattern 518 from the density logs 516 of the offsite well indicates sections 221, 222, 223, 224, 225, and 226, as in FIG. 2. Based on the value of the current density log 519 and the shape changing pattern of previous logging points along the TVD, the point 1 of section 535 is in the section 525 in the offsite well. The response in section 525 is stretched to match the width of section 535 and the curtain color value is respectively matched with values of the stretched section 525. Other sections of offsite well are stretched to match the layer structure along the TVD dimension.

Figure 6:
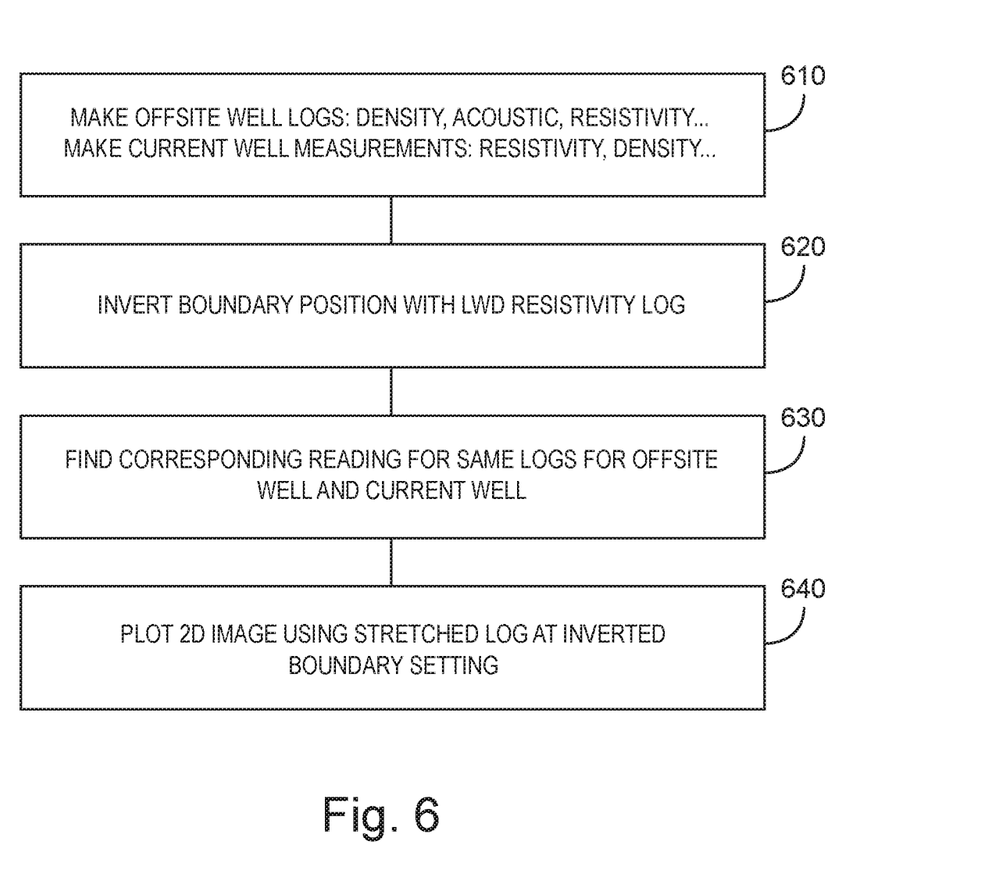
FIG. 6 is a flow chart of image plotting with comparison of logs between logging-while-drilling and an offsite well, in accordance with various embodiments.

FIG. 6 is a flow chart of image plot with comparison of logs between LWD measurements and an offsite well. At 610, logs of the offsite well are made, which can be selected as a density log, an acoustic log, a resistivity log, or other log, and LWD measurements of the current well of interest are made, which can be selected as a density measurement, an acoustic measurement, a resistivity measurement, or other measurement. At 620, boundary positions are determined by inversion using the LWD resistivity log. At 630, corresponding readings for the same logs for offsite well and the current well are found. At 640, a 2D image is plotted using stretched log at inverted boundary settings from the LWD resistivity logs.

The image plot with the methods of FIGS. 2 and 5 can be shown as in FIG. 4. The drilling points are in section 235. The upper layers 231-234 and lower layer 236 are moved with the relative location of the current layer 235. The color of the plotting can be based on the stretched density value from the offsite well. This image plot provides a completed view of the formation and the current drilling position. The local and far zone formation characters are included in this plot, which can improve the accuracy of the drilling design in real-time. Also, the updated formation information is a valuable reference for the future well planning.

Figure 7:
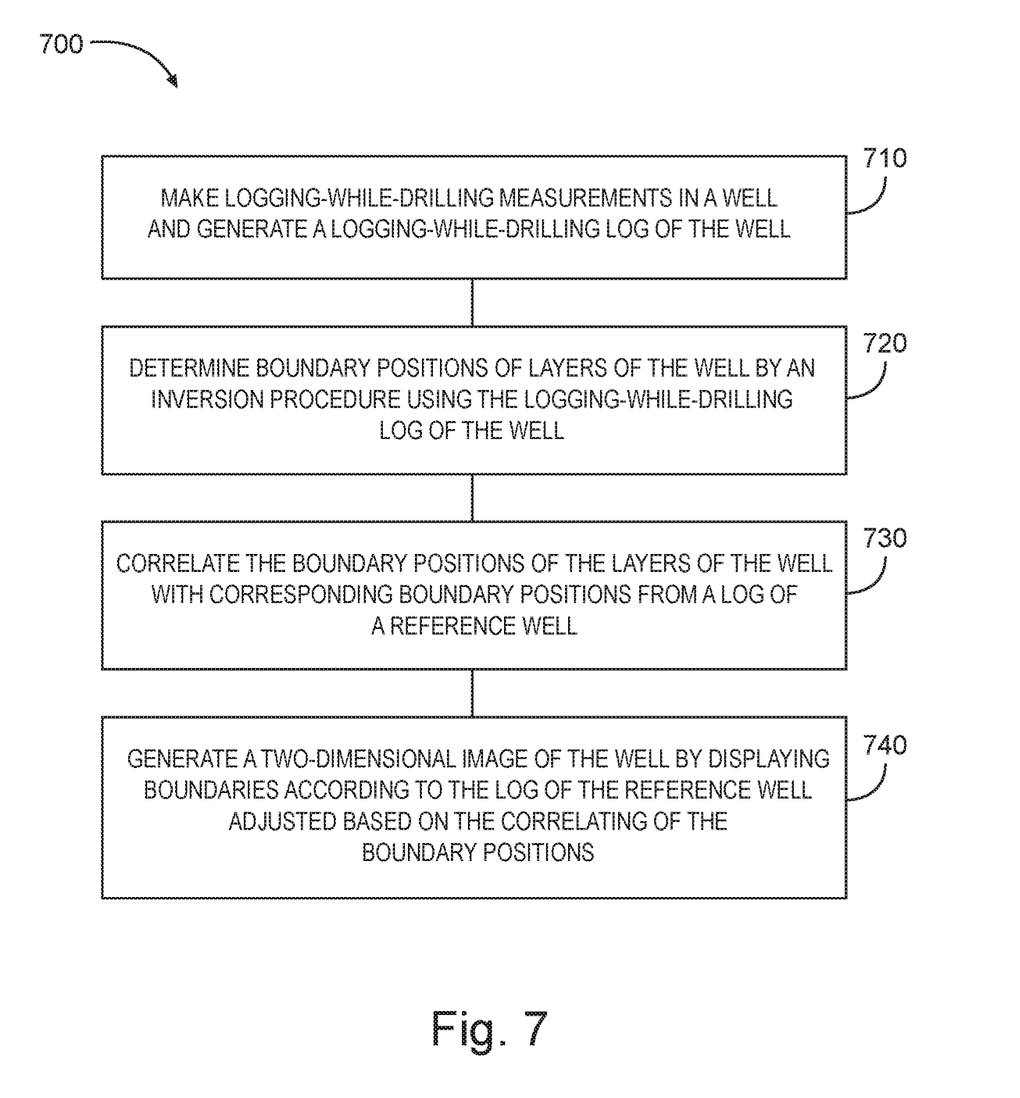
FIG. 7 is a flow diagram of features of an example method of visualizing boundaries of a well, in accordance with various embodiments.

FIG. 7 is a flow diagram of features of an embodiment of an example method 700 of visualizing boundaries of a well. At 710, logging-while-drilling measurements in a well are made and a logging-while-drilling log of the well is generated. The well for which the logging-while-drilling log of the well is generated from the logging-while-drilling measurements is a well under investigation. The log of the reference well and the logging-while-drilling log of the well under investigation can be logs of the same type of measurement. The same type of measurement can be a measurement selected from a group consisting of density measurement, acoustic measurement, and resistivity measurement. At 720, boundary positions of layers of the well by an inversion procedure using the logging-while-drilling log of the well are determined.

At 730, the boundary positions of the layers of the well are correlated with corresponding boundary positions from a log of a reference well. The reference well is different from the well under investigation. The log of the reference well can be a density log and the logging-while-drilling log of the well under investigation can be a resistivity log, and correlating the boundary positions can include performing a pattern matching of the density log and the resistivity log. Correlating the boundary positions of the layers of the well with corresponding boundary positions from the log of the reference well can include finding corresponding readings of the logging-while-drilling log of the well under investigation and the log of the reference well.

At 740, a two-dimensional image of the well is generated by displaying boundaries according to the log of the reference well adjusted based on the correlating of the boundary positions. Generating the two-dimensional image of the well can include displaying boundaries according to the log of the reference well adjusted based on the correlating of the boundary positions for layers along a vertical distance of the well and displaying each layer with a color, where the color is different for layers having a common boundary.

Method 700 or methods similar to method 700 can include performing the pattern matching to match a point between two identified boundaries from the inversion procedure using the logging-while-drilling log of the well under investigation to a point between two boundaries generated from the log of the reference well, where the two identified boundaries from the inversion procedure are separated by a first distance and the two boundaries are generated from the log of the reference well having a second distance; and performing the adjustment by stretching the two boundaries generated from the reference log, positively or negatively, such that the second distance is made to equal the first distance.

In various embodiments, a non-transitory machine-readable storage device can comprise instructions stored thereon, which, when executed by one or more processors of a machine, cause the machine to perform operations, the operations comprising one or more features similar to or identical to features of methods and techniques described with respect to method 700, variations thereof, and/or features of other methods taught herein such as associated with methods shown in FIGS. 3 and 5, for example. The structures of such instructions may be operated on by one or more processors. Executing these structures can cause the machine to perform operations comprising: making logging-while-drilling measurements in a well, generating a logging-while-drilling log of the well, the well being a well under investigation; determining boundary positions of layers of the well by an inversion procedure using the logging-while-drilling log of the well; correlating the boundary positions of the layers of the well with corresponding boundary positions from a log of a reference well, the reference well being different from the well under investigation; and generating a two-dimensional image of the well by displaying boundaries according to the log of the reference well adjusted based on the correlating of the boundary positions. The instructions can include instructions to operate a tool or tools having sensors disposed downhole in a borehole to provide data to process in accordance with the teachings herein.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 835 of FIG. 8. While memory module 835 is shown as a single unit, terms such as "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Executing the instructions can include a number of additional features. The log of the reference well can be a density log and the logging-while-drilling log of the well under investigation can be a resistivity log, and correlating the boundary positions can include performing a pattern matching of the density log and the resistivity log. The log of the reference well and the logging-while-drilling log of the well under investigation can be logs of the same type of measurement. The same type of measurement can be a measurement selected from a group consisting of density measurement, acoustic measurement, and resistivity measurement. Correlating the boundary positions of the layers of the well with corresponding boundary positions from the log of the reference well can include finding corresponding readings of the logging-while-drilling log of the well under investigation and the log of the reference well. Generating the two-dimensional image of the well can include displaying boundaries according to the log of the reference well adjusted based on the correlating of the boundary positions for layers along a vertical distance of the well and displaying each layer with a color, the color being different for layers having a common boundary. In various embodiments, the operations can include: performing the pattern matching to match a point between two identified boundaries from the inversion procedure using the logging-while-drilling log of the well under investigation to a point between two boundaries generated from the log of the reference well, the two identified boundaries from the inversion procedure separated by a first distance and the two boundaries generated from the log of the reference well having a second distance; and performing the adjustment by stretching the two boundaries generated from the reference log, positively or negatively, such that the second distance can be made to equal the first distance.

Figure 8:
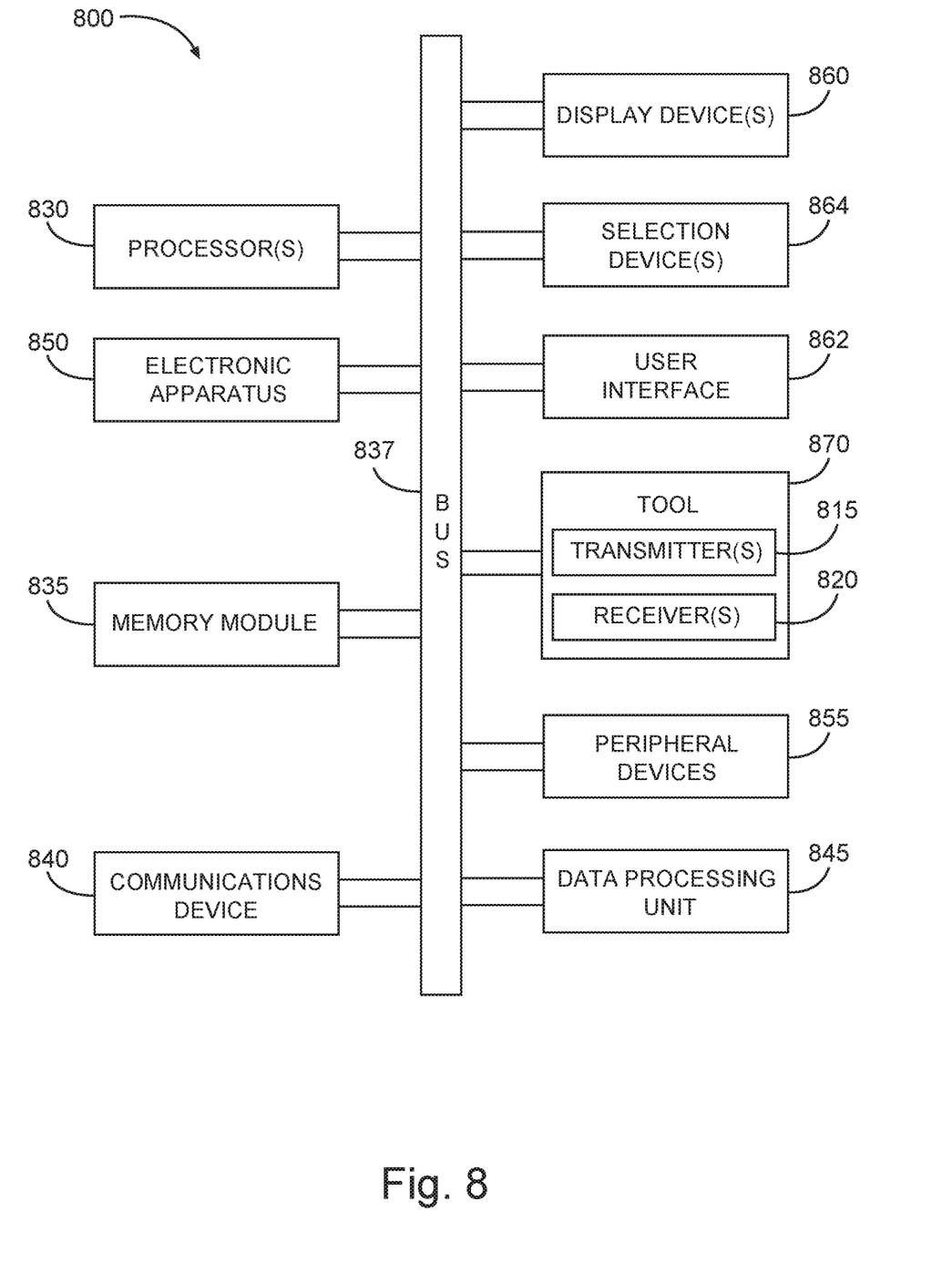
FIG. 8 is a block diagram of features of an example system operable to execute schemes associated with joint visualization of inversion results and measurement logs, in accordance with various embodiments.

FIG. 8 is a block diagram of features of an embodiment of an example system 800 operable to execute schemes associated with joint visualization of inversion results and measurement logs. System 800 can include a tool 870 having sensor transmitters 815 and receivers 820, a processor 830, a communications device 840, and a display device 860. The tool 870 with its sensor transmitters 815 and receivers 820 is operable to make logging-while-drilling measurements in a first well to generate a logging-while-drilling log of the first well. The communications device 840 can be operable to acquire a log of a reference well, the reference well being different from the first well. The processor 830 can be operatively coupled to the communications device 840 and arranged to determine boundary positions of layers of the first well by an inversion procedure using the logging-while-drilling log of the first well, to correlate the boundary positions of the layers of the first well with corresponding boundary positions obtainable from the log of the reference well, and to generate a two-dimensional image of the first well by a display of boundaries according to the log of the reference well adjusted based on the correlation of the boundary positions. The display device 860 can be arranged to visualize the two-dimensional image.

The system 800 can be operable in a number of applications. The log of the reference well can be a density log and the logging-while-drilling log of the first well can be a resistivity log, and correlation of the boundary positions can include performance of a pattern matching of the density log and the resistivity log. The processor 830 can be arranged to perform the pattern matching to match a point between two identified boundaries from the inversion procedure using the logging-while-drilling log of the first well to a point between two boundaries generated from the log of the reference well, the two identified boundaries from the inversion procedure separated by a first distance and the two boundaries generated from the log of the reference well having a second distance; and to perform the adjustment by a stretching of the two boundaries generated from the reference log, positively or negatively, such that the second distance is made to equal the first distance.

The log of the reference well and the logging-while-drilling log of the well under investigation can be logs of the same type of measurement. The same type of measurement can be a measurement selected from a group consisting of density measurement, acoustic measurement, and resistivity measurement. Correlation of the boundary positions of the layers of the first well with corresponding boundary positions obtainable from the log of the reference well can include a determination of a correspondence between readings of the logging-while-drilling log of the first well and the log of the reference well.

The display device 860 in conjunction with the processor 830 can be arranged such that generation of the two-dimensional image of the first well can include a display of boundaries according to the log of the reference well adjusted based on the correlation of the boundary positions for layers along a vertical distance of the well and a display of each layer with a color, the color being different for layers having a common boundary.

The processor 830 can be realized as one or more processors 830. In an embodiment, processor(s) 830 can be realized as a single processor or a group of processors. Processors of the group of processors may operate independently depending on an assigned function. The system 800 can also include a user interface 862 operable with the one or more processors 830, a data processing unit 845 operable with the user interface 862, where the one or more processors 830, the user interface 862, and the data processing unit 845 can be structured to be operated according to any scheme similar to or identical to the schemes associated with joint visualization of inversion results and parameter logs as taught herein. The system 800 can be arranged to perform various operations on the data, acquired from a tool 870 operational in a borehole, in a manner similar or identical to any of the processing techniques discussed herein.

The system 800 can be arranged as a distributed system and can include components in addition to the tool 870 and its sensor transmitters 815 and receivers 820, the processor 830, the communications device 840, and the display device 860. Data from operating the tool 870 at various depths can be visualized in one format or another by the one or more processors 830, the user interface 862, and the data processing unit 845. Such information may be presented as a visualization with respect to a number of different parameters as taught herein. The data processing unit 845 may be implemented to analyze the visualization to generate quantifications of the generated image to provide proper remedial actions such as, but not limited to, a change in drilling direction.

The system 800 can include a memory module 835 and an electronic apparatus 850. The processor(s) 830, the memory module 835, and the communications unit 840 can be arranged to operate as a processing unit to control management of tool 870 and to perform operations on data signals collected by the tool 870. The memory module 835 can include a database having information and other data such that the system 800 can operate on data from the tool 870. In an embodiment, the data processing unit 845 can be distributed among the components of the system 800 including memory module 835 and/or the electronic apparatus 850.

The communications unit 840 can include downhole communications for communication to the surface at a well site from the tool 870 in a LWD arrangement. Such downhole communications can include a telemetry system. The communications unit 840 may use combinations of wired communication technologies and wireless technologies at frequencies that do not interfere with on-going measurements. The communications unit 840 can allow for a portion or all of the data analysis to be conducted within the borehole with results provided to the user interface 862 for presentation on one or more display device(s) 860 aboveground. The communications unit 840 can provide for data to be sent aboveground such that substantially all analysis is performed aboveground. The data collected by the tool 870 can be stored with the tool 870 that may be brought to the surface to provide the data to the one or more processors 830, the user interface 862, and the data processing unit 845. The communications unit 840 can allow for transmission of commands to tool 870 in response to signals provided by a user through the user interface 862.

The system 800 can also include a bus 837, where the bus 837 provides electrical conductivity among the components of the system 800. The bus 837 can include an address bus, a data bus, and a control bus, each independently configured. The bus 837 can be realized using a number of different communication mediums that allows for the distribution of components of the system 800. Use of the bus 837 can be regulated by the processor(s) 830. The bus 837 can include a communications network to transmit and receive signals including data signals and command and control signals.

In various embodiments, the peripheral devices 855 can include additional storage memory and/or other control devices that may operate in conjunction with the processor(s) 830 and/or the memory module 835. The display device(s) 860 can be arranged with a screen display, as a distributed component on the surface, that can be used with instructions stored in the memory module 835 to implement the user interface 862 to manage the operation of the tool 870 and/or components distributed within the system 800. Such a user interface can be operated in conjunction with the communications unit 840 and the bus 837. The display device(s) 860 can include a video screen, a printing device, or other structure to visually project data/information. The system 800 can include a number of selection devices 864 operable with the user interface 862 to provide user inputs to operate the data processing unit 845 or its equivalent. The selection device(s) 864 can include one or more of a touch screen or a computer mouse operable with the user interface 862 to provide user inputs to operate the data processing unit 845.

Figure 9:
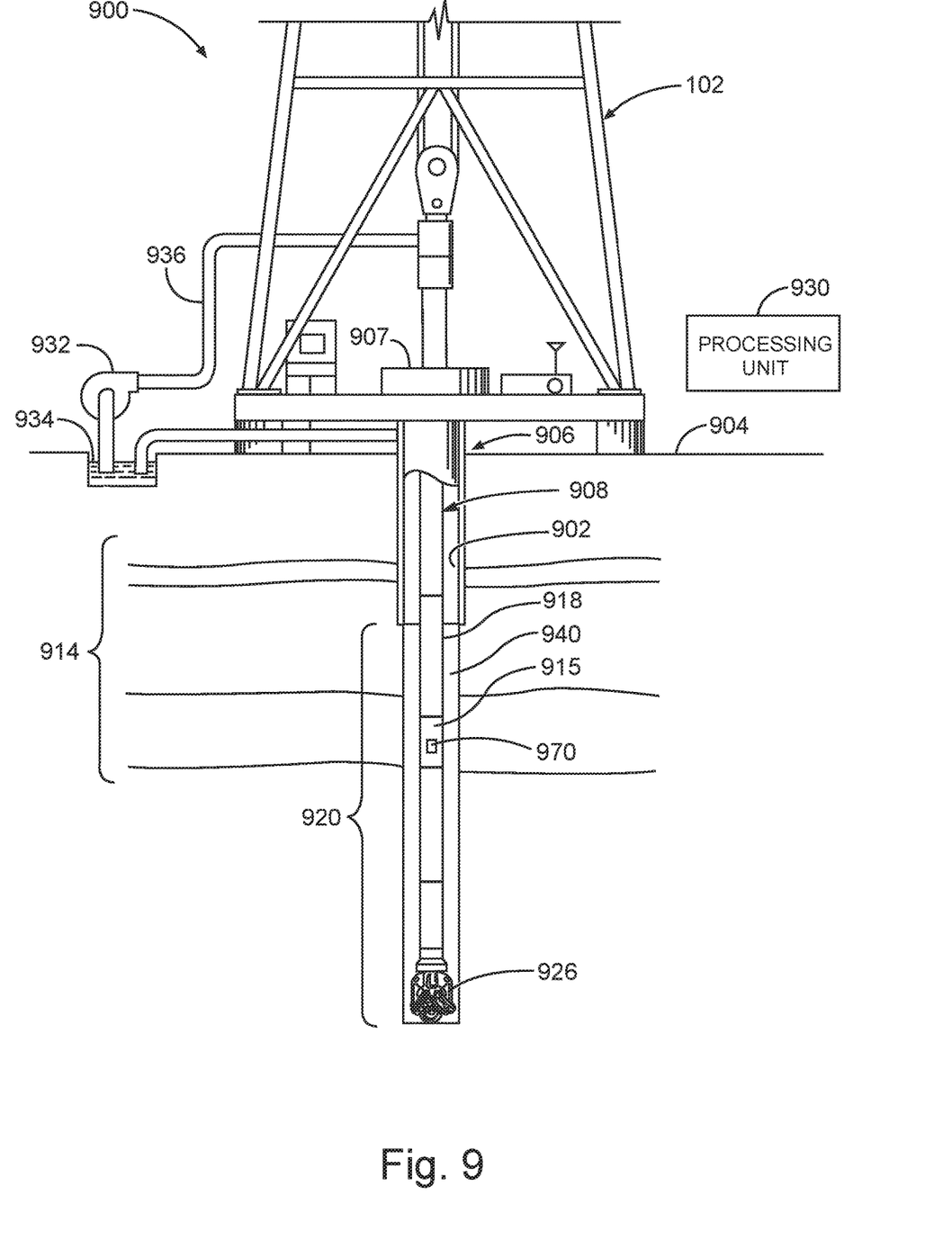
FIG. 9 is a schematic diagram of an example drilling system, in accordance with various embodiments.

FIG. 9 is a schematic diagram of an embodiment of an example system 900 at a drilling site, where the system 900 is operable to execute schemes associated with joint visualization of inversion results and measurement logs. System 900 can include a tool 970 having sensor transmitters and receivers to make measurements downhole and a processing unit 930 to operate on the signals/data from the measurements along with logs from offsite wells in a similar or identical manner to arrangements taught herein.

A control unit and processing unit of the measurement tool 970 can be distributed among system 900 or can be integrated with measurement tool 970 providing for control and analysis activities to be conducted downhole. The measurement tool 970 can be realized in a similar manner or an identical manner to arrangements and processing discussed herein to make downhole measurements. Components of the processing unit 930 located at a surface 904 of a well 906 can include a display to provide results of operation on the measurement data collected by tool 970 as taught herein.

The system 900 can include a drilling rig 902 located at the surface 904 of the well 906 and a string of drill pipes, that is, the drill string 908, connected together so as to form a drilling string that is lowered through a rotary table 907 into a wellbore or borehole 912. The drilling rig 902 can provide support for the drill string 908. The drill string 908 can operate to penetrate the rotary table 907 for drilling the borehole 912 through subsurface formations 914. The drill string 908 can include drill pipe 918 and a bottom hole assembly 920 located at the lower portion of the drill pipe 918.

The bottom hole assembly 920 can include a drill collar 915, the tool 970 attached to the drill collar 915, and a drill bit 926. The drill bit 926 can operate to create the borehole 912 by penetrating the surface 904 and the subsurface formations 914. The tool 970 can be structured for an implementation in the borehole 912-1 as a measurements-while-drilling (MWD) system, such as a LWD system. The housing containing the measurement tool 970 can include electronics to control the sensors of the measurement tool 970. Such electronics can include a processing unit to receive sensor data and to provide logging data and analysis to the surface over a standard communication mechanism for operating a well. Alternatively, electronics can include a communications interface to provide signals output by sensors of the measurement tool 970 to the surface over a standard communication mechanism for operating a well, where these output signals can be analyzed at the processing unit 930 at the surface.

During drilling operations, the drill string 908 can be rotated by the rotary table 907. In addition to, or alternatively, the bottom hole assembly 920 can also be rotated by a motor (e.g., a mud motor) that is located downhole. The drill collars 915 can be used to add weight to the drill bit 926. The drill collars 915 also can stiffen the bottom hole assembly 920 to allow the bottom hole assembly 920 to transfer the added weight to the drill bit 926, and in turn, assist the drill bit 926 in penetrating the surface 904 and subsurface formations 914.

During drilling operations, a mud pump 932 can pump drilling fluid (sometimes known by those of skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 912. The drilling fluid may then be returned to the mud pit 934, where such fluid is filtered. In some embodiments, the drilling fluid can be used to cool the drill bit 926, as well as to provide lubrication for the drill bit 926 during drilling operations. Additionally, the drilling fluid may be used to remove subsurface formation 914 cuttings created by operating the drill bit 926.

Images can be plotted using logs from both current and offsite wells. Such a technique can give an image with accurate local boundary location based on the whole formation image. The high quality of the image can be used to provide an accurate geosteering decision. Also, the updated formation profile from applying the technique can be a good reference to enhance formation knowledge. Determination of the precise location of a drilling procedure with this image plot can reduce the drilling risks and avoid passing out the target zone. It can attain more production than when the drilling point is out of range. Also, an accurate formation adjustment using the image plot can provide high quality formation estimation, which is good reference for another well plan.

The following are example embodiments of methods and systems in accordance with the teachings herein.

A method 1 can comprise: making logging-while-drilling measurements in a well and generating a logging-while-drilling log of the well, the well being a well under investigation; determining boundary positions of layers of the well by an inversion procedure using the logging-while-drilling log of the well; correlating the boundary positions of the layers of the well with corresponding boundary positions from a log of a reference well, the reference well being different from the well under investigation; and generating a two-dimensional image of the well by displaying boundaries according to the log of the reference well adjusted based on the correlating of the boundary positions.

A method 2 can include elements of method 1 and can include the log of the reference well being a density log and the logging-while-drilling log of the well under investigation being a resistivity log, and correlating the boundary positions can include performing a pattern matching of the density log and the resistivity.

A method 3 can include elements of method 2 and elements of method 1 and can include performing the pattern matching to match a point between two identified boundaries from the inversion procedure using the logging-while-drilling log of the well under investigation to a point between two boundaries generated from the log of the reference well, the two identified boundaries from the inversion procedure separated by a first distance and the two boundaries generated from the log of the reference well having a second distance; and performing the adjustment by stretching the two boundaries generated from the reference log, positively or negatively, such that the second distance is made to equal the first distance.

A method 4 can include elements of any of methods 1-3 and can include the log of the reference well and the logging-while-drilling log of the well under investigation being logs of the same type of measurement.

A method 5 can include elements of method 4 and elements of any of methods 1-3 and can include the same type of measurement being a measurement selected from a group consisting of density measurement, acoustic measurement, and resistivity measurement.

A method 6 can include elements of method 4 and elements of any of methods 1-3 and 5 and can include correlating the boundary positions of the layers of the well with corresponding boundary positions from the log of the reference well to include finding corresponding readings of the logging-while-drilling log of the well under investigation and the log of the reference well.

A method 7 can include any of methods 1-6 and can include generating the two-dimensional image of the well to include displaying boundaries according to the log of the reference well adjusted based on the correlating of the boundary positions for layers along a vertical distance of the well and displaying each layer with a color, the color being different for layers having a common boundary.

A machine-readable storage device 1 having instructions stored thereon, which, when executed by one or more processors of a machine, cause the machine to perform operations, the operations can comprise: making logging-while-drilling measurements in a well and generating a logging-while-drilling log of the well, the well being a well under investigation; determining boundary positions of layers of the well by an inversion procedure using the logging-while-drilling log of the well; correlating the boundary positions of the layers of the well with corresponding boundary positions from a log of a reference well, the reference well being different from the well under investigation; and generating a two-dimensional image of the well by displaying boundaries according to the log of the reference well adjusted based on the correlating of the boundary positions.

A machine-readable storage device 2 can include elements of machine-readable storage device 1 and can include the log of the reference well being a density log and the logging-while-drilling log of the well under investigation being a resistivity log, and correlating the boundary positions can include performing a pattern matching of the density log and the resistivity.

A machine-readable storage device 3 can include elements of machine-readable storage device 2 and elements of machine-readable storage device 1 and can include operations to include performing the pattern matching to match a point between two identified boundaries from the inversion procedure using the logging-while-drilling log of the well under investigation to a point between two boundaries generated from the log of the reference well, the two identified boundaries from the inversion procedure separated by a first distance and the two boundaries generated from the log of the reference well having a second distance; and performing the adjustment by stretching the two boundaries generated from the reference log, positively or negatively, such that the second distance is made to equal the first distance.

A machine-readable storage device 4 can include elements of any of machine-readable storage devices 1-3 and can include the log of the reference well and the logging-while-drilling log of the well under investigation being logs of the same type of measurement.

A machine-readable storage device 5 can include elements of machine-readable storage device 4 and elements of any of machine-readable storage devices 1-3 and can include the same type of measurement being a measurement selected from a group consisting of density measurement, acoustic measurement, and resistivity measurement.

A machine-readable storage device 6 can include elements of machine-readable storage device 4 and elements of any of machine-readable storage devices 1-3 and 5 and can include correlating the boundary positions of the layers of the well with corresponding boundary positions from the log of the reference well to include finding corresponding readings of the logging-while-drilling log of the well under investigation and the log of the reference well.

A machine-readable storage device 7 can include any of machine-readable storage devices 1-6 and can include generating the two-dimensional image of the well to include displaying boundaries according to the log of the reference well adjusted based on the correlating of the boundary positions for layers along a vertical distance of the well and displaying each layer with a color, the color being different for layers having a common boundary.

A system 1 can comprise: a tool having transmitting sensors and receivers to make logging-while-drilling measurements in a first well to generate a logging-while-drilling log of the first well; a communications device to acquire a log of a reference well, the reference well being different from the first well; a processor operatively coupled to the communications device and arranged to determine boundary positions of layers of the first well by an inversion procedure using the logging-while-drilling log of the first well, to correlate the boundary positions of the layers of the first well with corresponding boundary positions obtainable from the log of the reference well, and to generate a two-dimensional image of the first well by a display of boundaries according to the log of the reference well adjusted based on the correlation of the boundary positions; and a display device to visualize the two-dimensional image.

A system 2 can include elements of system 1 and can include the log of the reference well being a density log and the logging-while-drilling log of the first well being a resistivity log, and correlation of the boundary positions includes performance of a pattern matching of the density log and the resistivity log.

A system 3 can include elements of system 2 and elements of system 1 and can include the processor arranged to: perform the pattern matching to match a point between two identified boundaries from the inversion procedure using the logging-while-drilling log of the first well to a point between two boundaries generated from the log of the reference well, the two identified boundaries from the inversion procedure separated by a first distance and the two boundaries generated from the log of the reference well having a second distance; and perform the adjustment by a stretching of the two boundaries generated from the reference log, positively or negatively, such that the second distance is made to equal the first distance.

A system 4 can include elements of any of systems 1-3 and can include the log of the reference well and the logging-while-drilling log of the well under investigation being logs of the same type of measurement.

A system 5 can include elements of system 4 and elements of any of systems 1-3 and can include the same type of measurement being a measurement selected from a group consisting of density measurement, acoustic measurement, and resistivity measurement.

A system 6 can include elements of system 4 and elements of any of systems 1-3 and 5 and can include correlation of the boundary positions of the layers of the first well with corresponding boundary positions obtainable from the log of the reference well to include a determination of a correspondence between readings of the logging-while-drilling log of the first well and the log of the reference well.

A system 7 can include any of systems 1-6 and can include generation of the two-dimensional image of the well to include a display of boundaries according to the log of the reference well adjusted based on the correlation of the boundary positions for layers along a vertical distance of the first well and a displaying of each layer with a color, the color being different for layers having a common boundary.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   making logging-while-drilling measurements in a well that is under investigation and generating a logging-while-drilling log of the well, wherein the logging-while-drilling log is a resistivity log;
   determining boundary positions of layers of the well by an inversion procedure using the resistivity log;
   correlating the boundary positions of the layers of the well with corresponding boundary positions from a log of a reference well, wherein the log of the reference well is a density log, and wherein correlating the boundary positions includes performing a pattern matching of the resistivity log and the density log; and
   generating a two-dimensional image of the well by displaying boundaries according to the density log adjusted based on the correlating of the boundary positions.

2. The method of claim 1, wherein the method includes:
   performing the pattern matching to match a point between two identified boundaries from the inversion procedure using the resistivity log of the to a point between two boundaries generated from the density log, the two identified boundaries from the inversion procedure separated by a first distance and the two boundaries generated from the density log having a second distance; and performing the adjustment by stretching the two boundaries generated from the density log, positively or negatively, such that the second distance is made to equal the first distance.

3. The method of claim 1, wherein the resistivity log and density log include measurements selected from a group consisting of density measurement, acoustic measurement, and resistivity measurement.

4. The method of claim 1, wherein correlating the boundary positions of the layers of the well under investigation with corresponding boundary positions from the density log includes finding corresponding readings of the resistivity log and the density log.

5. The method of claim 1, wherein generating the two-dimensional image of the well includes displaying boundaries according to the density log adjusted based on the correlating of the boundary positions for layers along a vertical distance of the well and displaying each layer with a color, the color being different for layers having a common boundary.

6. A machine-readable storage device having instructions stored thereon, which, when executed by one or more processors of a machine, cause the machine to perform operations, the operations comprising:

making logging-while-drilling measurements in a well that is under investigation to generate a resistivity log of the well;

determining boundary positions of layers of the well by an inversion procedure using the resistivity log;

correlating the boundary positions of the layers of the well with corresponding boundary positions from a density log of a reference well, wherein correlating the boundary positions includes performing a pattern matching of the resistivity log and the density log; and generating a two-dimensional image of the well by displaying boundaries according to the density log adjusted based on the correlating of the boundary positions.

7. The machine-readable storage device of claim 6, wherein the operations include:

performing the pattern matching to match a point between two identified boundaries from the inversion procedure using the resistivity log to a point between two boundaries generated from the density log, the two identified boundaries from the inversion procedure separated by a first distance and the two boundaries generated from the density log having a second distance; and performing the adjustment by stretching the two boundaries generated from the density log, positively or negatively, such that the second distance is made to equal the first distance.

8. The machine-readable storage device of claim 6, wherein the resistivity log and density log include measurements selected from a group consisting of density measurement, acoustic measurement, and resistivity measurement.

9. The machine-readable storage device of claim 6, wherein correlating the boundary positions of the layers of the well with corresponding boundary positions from the density log includes finding corresponding readings of the resistivity log and the density log.

10. The machine-readable storage device of claim 6, wherein generating the two-dimensional image of the well includes displaying boundaries according to the density log adjusted based on the correlating of the boundary positions for layers along a vertical distance of the well and displaying each layer with a color, the color being different for layers having a common boundary.

11. A system comprising:

a tool having transmitting sensors and receivers to make logging-while-drilling measurements in a first well to generate a resistivity log of the first well;

a communications device to acquire a density log of a reference well, the reference well being different from the first well;

a processor operatively coupled to the communications device and arranged to, determine boundary positions of layers of the first well by an inversion procedure using the resistivity log;

correlate the boundary positions of the layers of the first well with corresponding boundary positions obtainable from the log of the reference well, wherein correlating the boundary positions includes performing a pattern matching of the resistivity log and the density log; and generate a two-dimensional image of the first well by a display of boundaries according to the density log adjusted based on the correlation of the boundary positions; and a display device to visualize the two-dimensional image.

12. The system of claim 11, wherein the processor is arranged to:

perform the pattern matching to match a point between two identified boundaries from the inversion procedure using the resistivity log to a point between two boundaries generated from the density log, the two identified boundaries from the inversion procedure separated by a first distance and the two boundaries generated from the density log having a second distance; and perform the adjustment by a stretching of the two boundaries generated from the density log, positively or negatively, such that the second distance is made to equal the first distance.

13. The system of claim 11, wherein the resistivity log and density log includes measurements selected from a group consisting of density measurement, acoustic measurement, and resistivity measurement.

14. The system of claim 11, wherein correlation of the boundary positions of the layers of the first well with corresponding boundary positions obtainable from the density log includes a determination of a correspondence between readings of the resistivity log and the density log.

* * * * *